United States Patent
Yoneyama et al.

(10) Patent No.: US 8,471,912 B2
(45) Date of Patent: Jun. 25, 2013

(54) ELECTRONIC DEVICE AND COMMUNICATION SYSTEM

(75) Inventors: Masayuki Yoneyama, Osaka (JP); Kunihiro Shibata, Osaka (JP)

(73) Assignee: Panasonic Corporation, Osaka (JP)

( * ) Notice: Subject to any disclaimer, the term of this patent is extended or adjusted under 35 U.S.C. 154(b) by 290 days.

(21) Appl. No.: 12/965,110

(22) Filed: Dec. 10, 2010

(65) Prior Publication Data

US 2011/0141293 A1    Jun. 16, 2011

(30) Foreign Application Priority Data

Dec. 14, 2009  (JP) ................. 2009-282510
Dec. 7, 2010   (JP) ................. 2010-272618

(51) Int. Cl.
| | |
|---|---|
| *H04N 5/225* | (2006.01) |
| *H04N 7/00* | (2006.01) |
| *H04N 5/222* | (2006.01) |
| *H04N 5/232* | (2006.01) |
| *H04N 5/775* | (2006.01) |
| *H04N 5/765* | (2006.01) |

(52) U.S. Cl.
USPC ............... 348/207.1; 348/552; 348/333.05; 348/211.3; 386/230; 386/234

(58) Field of Classification Search
USPC .............. 348/383, 552, 211.3, 207.1, 333.05, 348/333.11; 455/3.06
See application file for complete search history.

(56) References Cited

U.S. PATENT DOCUMENTS

| | | | | |
|---|---|---|---|---|
| 2002/0191079 | A1* | 12/2002 | Kobayashi et al. | 348/207.1 |
| 2004/0080653 | A1  | 4/2004 | Tanaka et al. | |
| 2004/0223057 | A1* | 11/2004 | Oura et al. | 348/207.1 |
| 2006/0039221 | A1* | 2/2006 | Fukuda | 365/222 |
| 2008/0016144 | A1* | 1/2008 | Hyun et al. | 709/203 |
| 2010/0003016 | A1* | 1/2010 | Ishimaru | 386/117 |
| 2010/0091114 | A1* | 4/2010 | Ito | 348/207.1 |
| 2010/0312974 | A1* | 12/2010 | Kikuchi | 711/154 |
| 2011/0109751 | A1* | 5/2011 | Chang et al. | 348/207.1 |
| 2011/0228110 | A1* | 9/2011 | Thorson | 348/207.11 |
| 2012/0075529 | A1* | 3/2012 | Wong et al. | 348/552 |

FOREIGN PATENT DOCUMENTS

| | | |
|---|---|---|
| JP | 2004-40243 | 2/2004 |
| JP | 2004-120276 | 4/2004 |
| JP | 2007-158403 | 6/2007 |

* cited by examiner

*Primary Examiner* — Tuan Ho
*Assistant Examiner* — Shahbaz Nazrul
(74) *Attorney, Agent, or Firm* — Panasonic Patent Center

(57) ABSTRACT

There is provided an electronic device capable of connecting to an external device and outputting image data recorded in an internal or external recording medium though an internal or external sending unit to the external device. The electronic device includes an operation unit operable to receive an operation made by a user, and a controller operable to control sending the image data. The controller has a first communication mode which controls the sending unit so as to send image data selected by the operation unit, and a second communication mode which controls the sending unit so as to send image data requested from the external device, and the controller prohibits switching from the second communication mode to the first communication mode even when an operation to switch from the second communication mode to the first communication mode is performed on the operation unit in the second communication mode.

8 Claims, 11 Drawing Sheets

Fig. 6A

| DEVICE | ADDRESS |
|---|---|
| TELEVISION | 192. 168. 8. 2 |
| DIGITAL CAMERA | 192. 168. 8. 3 |

| DEVICE | ADDRESS |
|---|---|
| TELEVISION | 192. 168. 8. 2 |

B

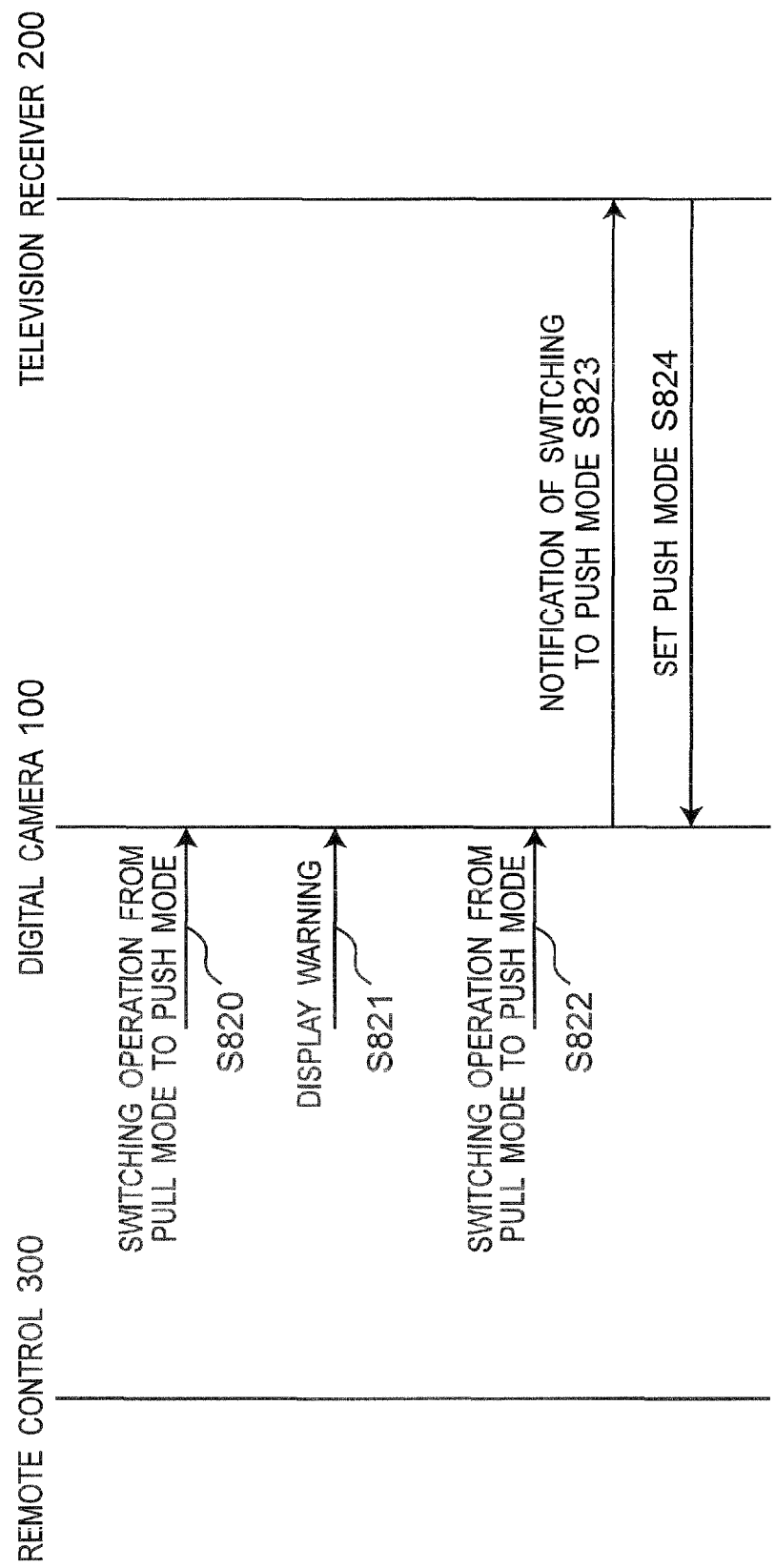

ELECTRONIC DEVICE AND COMMUNICATION SYSTEM

BACKGROUND

1. Technical Field

The technical field relates to an electronic device that records image data and can be connected to an external device and a communication system that connects the electronic device and the external device.

2. Related Art

Conventionally, there is a case where a television receiver (hereinafter, referred to as a "television") and a digital camera are connected each other via a connection cable, and an image captured up by the digital camera can be displayed on the television.

JP-A-2007-158403 discloses a system configured to be able to connect the digital camera and the television via wireless communication and display an image captured by a digital camera in a television. More specifically, in this system, the television has a broadcast receiving mode to receive television broadcasting and a still image mode capable of displaying an image received from the digital camera or the like and is configured to be able to wirelessly receive a mode switching signal from the digital camera. The digital camera is configured to be able to send the mode switching signal, switch the television from the broadcast receiving mode to the still image mode, and thereby cause the television to display the image from the digital camera.

According to the system described in JP-A-2007-158403, the following problem may arise. For example, when a father enjoys watching the television at home while a child enjoys viewing photographed images in the digital camera, if the child mistakenly performs an operation to switch the television to the still image mode from the digital camera, there may be a case where a television screen being watched by the father is abruptly switched. As described above, if an electronic device such as a digital camera or the like can send the image data to an external device such as a television, a trouble may occur in the external device.

In view of such a problem, an electronic device and a communication system is provided, which can prevent the trouble in the external device, which occurs in sending the image data from the electronic device to the external device.

SUMMARY

In a first aspect, there is provided an electronic device capable of connecting to an external device and outputting image data recorded in an internal or external recording medium through an internal or external sending unit to the external device. The electronic device includes an operation unit operable to receive an operation made by a user, and a controller operable to control sending the image data. The controller has a first communication mode which controls the sending unit so as to send image data selected by the operation unit, and a second communication mode which controls the sending unit so as to send image data requested from the external device, and the controller prohibits switching from the second communication mode to the first communication mode even when an operation to switch from the second communication mode to the first communication mode is performed on the operation unit in the second communication mode.

In a second aspect, there is provided a communication system comprising an electronic device and an external device that are mutually connected. The electronic device is capable of connecting to the external device and outputting image data recorded in an internal or external recording medium through an internal or external sending unit to the external device, and includes an operation unit operable to receive an operation by a user, and a controller operable to control sending the image data. The controller has a first communication mode which controls the sending unit so as to send image data selected by the operation unit, and a second communication mode which controls the sending unit so as to send image data requested from the external device, and the controller prohibits switching from the second communication mode to the first communication mode even when an operation to switch from the second communication mode to the first communication mode is performed on the operation unit in the second communication mode. The external device includes a receiving unit operable to receive the image data from the electronic device and the operation unit operable to receive the operation made by the user.

According to each of the above embodiments, the external device is prevented from being abruptly switched from the first communication mode to the second communication mode. That is, it prevents from causing a trouble in the external device. For example, a screen of the television can be prevented from being switched.

BRIEF DESCRIPTION OF DRAWINGS

FIG. 6A is a schematic diagram illustrating a table created by the television;

FIG. 6B is a schematic diagram illustrating a table created by the digital camera;

FIG. 9C is a sequence diagram illustrating the operation of the digital camera and the television (another example when an operation by the digital camera is performed in the PULL mode).

DETAILED DESCRIPTION OF PREFERRED EMBODIMENT

Embodiments will be described below.

1. First Embodiment

Figure 1:
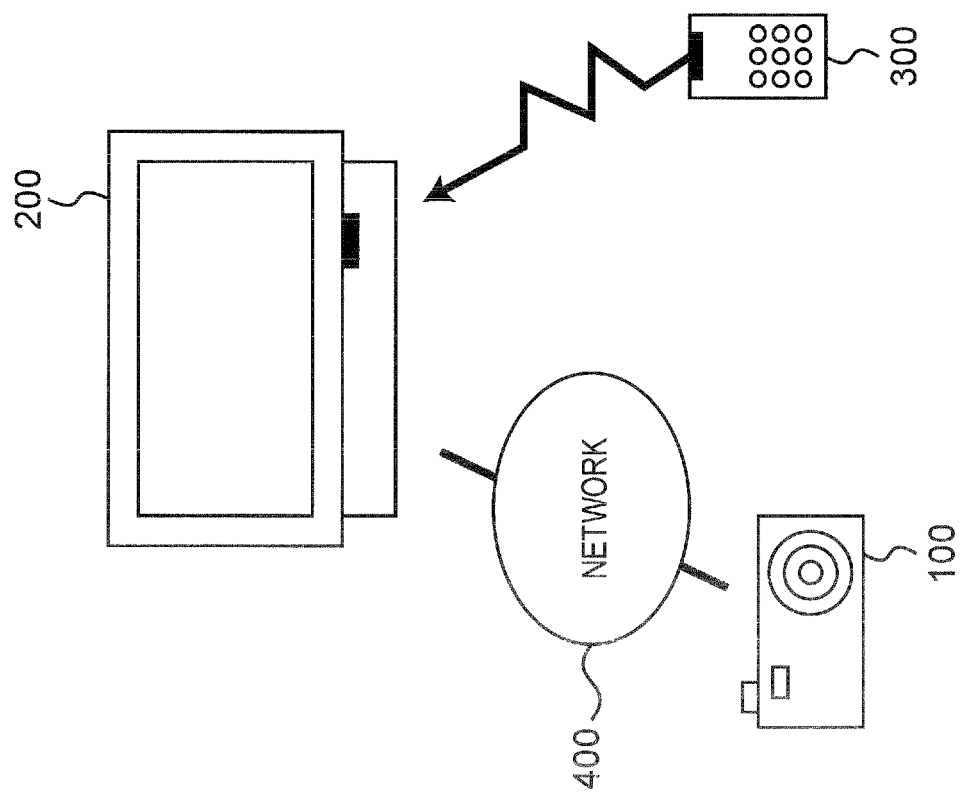
FIG. 1 is a diagram illustrating a connection state of a digital camera, a television, and a remote control.

FIG. 1 is a diagram showing a communication system configured by a digital camera 100 as an electronic device and a television receiver 200 (hereinafter, referred to as the television 200) as an external device.

1-1. Overview

The digital camera 100 according to the present embodiment can be connected to a network 400 configuring a communication system. The digital camera 100 can perform communication with another digital camera or the television 200 via the network 400. The television 200 displays an image obtained from the digital camera 100 via the network 400. A remote control 300 is an operation device capable of remotely operating the television 200. In the present embodiment, the digital camera 100 and the television 200 are connected to the network 400 through wireless communication. The television 200 receives an operation from the remote control 300 through infrared-ray communication. The communication method between the digital camera 100 and the television 200 is one example, and it may be another method other than wireless communication as long as the method enables communication of image data between the digital camera 100 and the television 200. Moreover, another method other than infrared-ray communication may be used as long as the method allows the television 200 to receive the operation from the remote control 300.

The digital camera 100 can remotely perform predetermined operations for the television 200. Moreover, the digital camera 100 can select only necessary image data from image data stored in the digital camera 100 and send the image data to the television 200 connected to the network 400 to display the image data.

1-2. Configuration

Next, configurations of the digital camera 100, the television 200, and the remote control 300 will be described.

1-2-1. Configuration of digital camera

Figure 2:
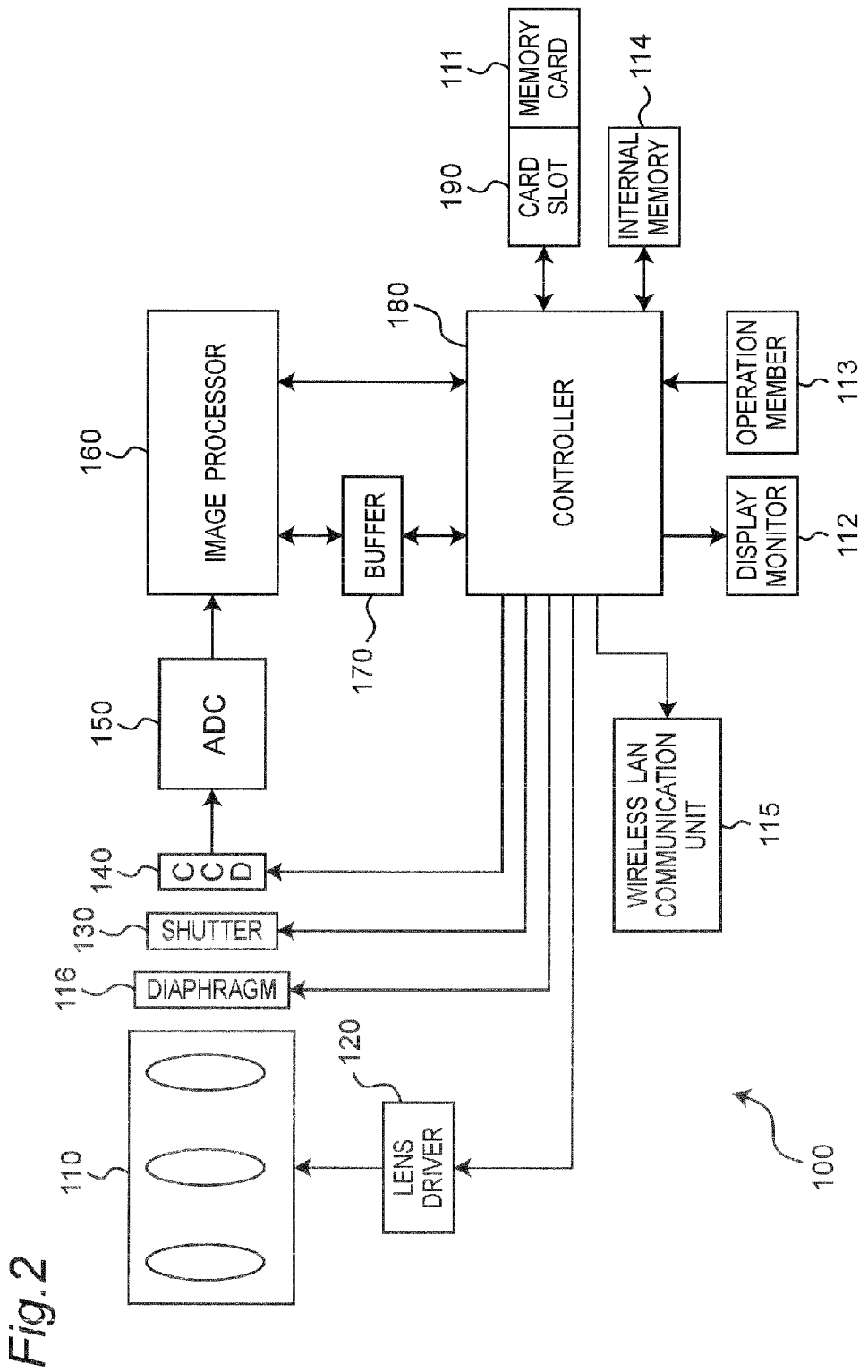
FIG. 2 is a block diagram showing a configuration of the digital camera.

An electric configuration of the digital camera 100 will be described with reference to FIG. 2. FIG. 2 is a block diagram showing the electric configuration of the digital camera 100. The digital camera 100 includes an optical system 110, a diaphragm 116, a lens driver 120, a shutter 130, a CCD 140, an A/D converter (hereinafter, referred to as "ADC") 150, an image processor 160, a buffer 170, a controller 180, a card slot 190, a display monitor 112, an operation member 113, an internal memory 114, and a wireless LAN communication unit 115. A memory card 111 as an external storage medium can be connected to the card slot 190.

The digital camera 100 captures a subject image formed by the optical system 110 by the CCD image sensor 140 to generate image data. The image data generated by the CCD image sensor 140 is stored in the memory card 111 after various processes being performed thereon by the image processor 160. The configuration of the digital camera 100 will be described below in detail.

The controller 180 controls the entire digital camera 100. The controller 180 can be realized by a semiconductor device or the like. The controller 180 may be configured only by hardware or a combination of hardware and software. The controller 180 can be realized by a microcomputer or the like.

The optical system 110 is configured by a plurality of lenses such as a zoom lens and a focus lens.

The lens driver 120 drives various lenses contained in the optical system 110 according to a control signal from the controller 180. The lens driver 120 is, for example, a zoom motor that drives a zoom lens or a focus motor that drives a focus lens and can be realized by a stepping motor, EC motor or the like. The lens driver 120 enlarges or reduces a subject image formed on the CCD image sensor 140 by moving the zoom lens along an optical axis. The lens driver 120 also adjusts focus of the subject image formed on the CCD image sensor 140 by moving the focus lens along the optical axis.

The diaphragm 116 adjusts a size of an opening and regulates an amount of light transmitted to the CCD image sensor 140 according to a control signal from the controller 180 in accordance with user settings or based on a predetermined program diagram.

The shutter 130 cuts off light incident on the CCD image sensor 140 according to the control signal from the controller 180.

The CCD image sensor 140 generates image data by capturing a subject image formed by the optical system 110. The CCD image sensor 140 performs various operations such as exposure, transfer, and electronic shutter according to the control signal from the controller 180.

The ADC 150 converts the image data generated by the CCD image sensor 140 from an analog format to a digital format.

The image processor 160 performs various processes on the image data generated by the CCD image sensor 140. The image processor 160 generates image data to be displayed in the display monitor 112 or generates image data to be stored in the memory card 111. For example, the image processor 160 performs various processes such as a gamma correction, white balance correction, and flaw correction on the image data generated by the CCD image sensor 140. The image processor 160 also compresses the image data generated by the CCD image sensor 140 according to a compression format conforming to the JPEG standard or the like. The image processor 160 also performs an enlargement process or reduction process electronically on the image data. At this point, the image processor 160 performs processes such as a cutout process of a portion of the image data, thinning process, and interpolation process on the image data as necessary. In this manner, the image processor 160 can change the number of pixels of the image data. The image processor 160 can be realized by a DSP, microcomputer or the like.

The buffer 170 functions as a work memory of the image processor 160 and the controller 180. The buffer 170 can be realized by, for example, a DRAM or ferroelectric memory.

The card slot 190 can connect the memory card 111 detachably. The card slot 190 can connect the memory card 111 mechanically and electrically. The memory card 111 contains a flash memory, ferroelectric memory or the like internally and can store the image data generated by the image processor 160.

The internal memory 114 is configured by a flash memory, ferroelectric memory or the like. The internal memory 114 stores a control program to control the entire digital camera 100. The internal memory 114 also stores a control program to control the television 200 connected to the digital camera 100 via the network 400. For example, the internal memory 114 stores a program to control the television 200 in an image sharing mode. The image sharing mode will be described later. When connection to the television 200 is completed, the digital camera 100 notifies the television 200 of the program which is stored in the internal memory 114 and controls the television 200. Accordingly, the television 200 can control itself based on the obtained program.

The display monitor 112 can display an image (through image) indicated by the image data generated by the CCD image sensor 140 or an image indicated by the image data read from the memory card 111. The display monitor 112 can also display various menu screens to make various settings for the digital camera 100. The display monitor 112 can be realized by a liquid crystal display, organic EL display or the like.

The operation member 113 receives an operation from the user. The operation member 113 is configured by, for example, a release button, a cross key, or a touch panel to receive the operation from the user. In this case, the release button receives a press operation by the user. If the user performs a half-press operation of the release button when the digital camera 100 is set to a photographing mode, an auto focus operation is performed, and if the user performs a full-press operation, a photographing operation is performed. Moreover, by operating the cross key, the user can also select an item from the menu displayed in the display monitor 112 in accordance with an operated key direction. As other embodiment, by touching the touch panel, the user can also select an item from the menu displayed in the display monitor 112.

The wireless LAN communication unit 115 is a communication unit to realize wireless communication and can connect to the network 400 through wireless LAN communication. The wireless LAN communication unit 115 is modularized in most cases, but may be configured as a portion of the controller 180. It should be noted that the wireless LAN communication unit 115 may be an internal device, or an external wireless LAN interface capable of attaching and detaching to and from the digital camera 100. The digital camera 100 performs various kinds of communication with the television 200 via the network 400 connected through wireless communication. For example, the digital camera 100 can notify the television 200 of the image data stored in the memory card 111 via the network 400. The digital camera 100 can also notify the television 200 of the program which is stored in the internal memory 114 via the network 400 and controls the television 200.

1-2-2. Configuration of Television Receiver

Figure 3:
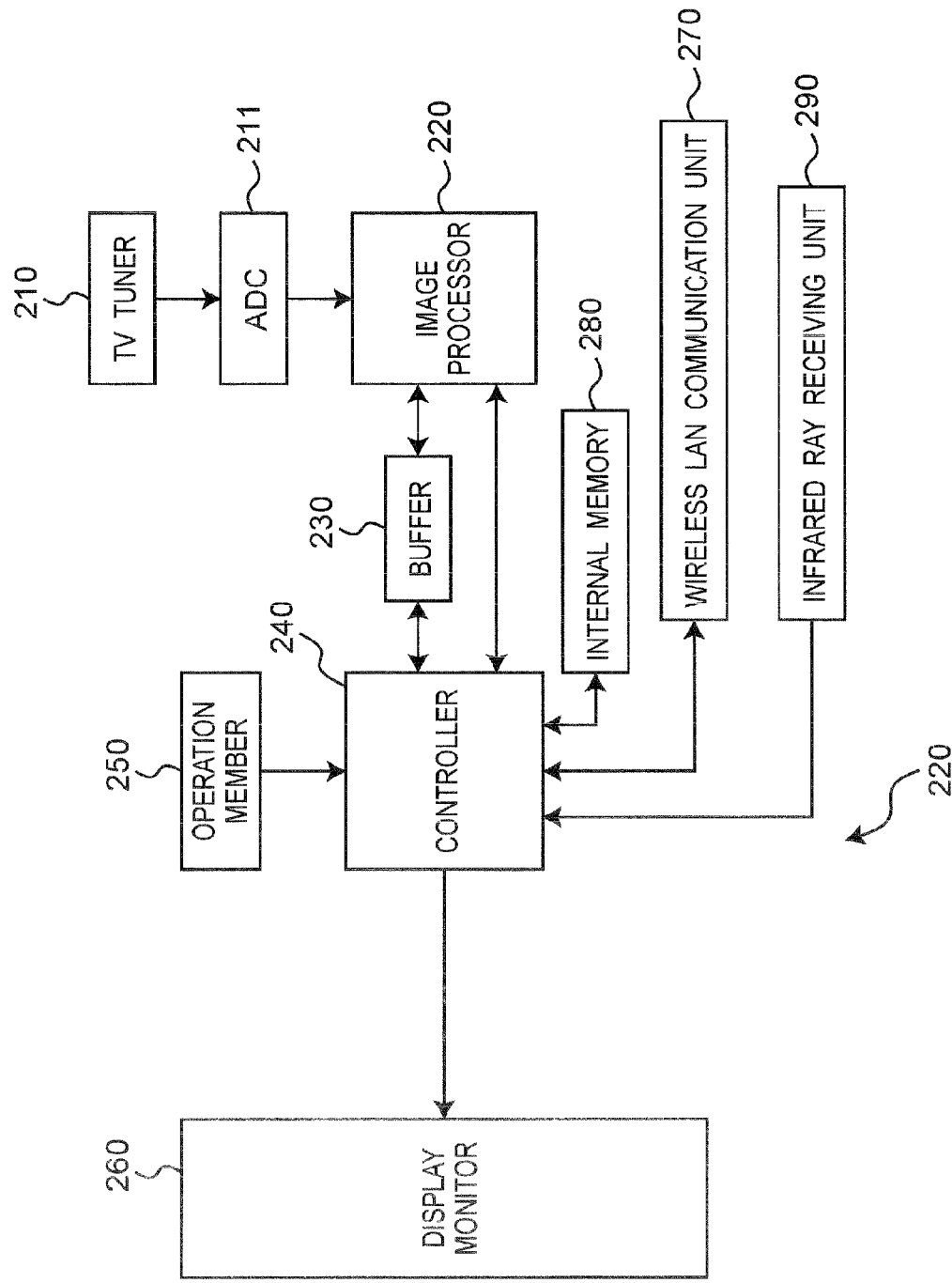
FIG. 3 is a block diagram showing a configuration of the television.

An electric configuration of the television 200 will be described with reference to FIG. 3. FIG. 3 is a block diagram showing the configuration of the television 200. The television 200 includes a television tuner 210, an A/D converter (hereinafter, referred to as an "ACC") 211, an image processor 220, a buffer 230, a controller 240, an operation member 250, a display monitor 260, a wireless LAN communication unit 270, an internal memory 280, and an infrared ray receiving unit 290.

The television 200 receives a video signal by the television tuner 210. The television 200 can perform various image processes on the received video signal by the image processor 220 and display the video indicated by the video signal after the image process in the display monitor 260. The television 200 can also obtain image data from another device via the wireless LAN communication unit 270 to display images indicated by the obtained image data in the display monitor 260. The television. 200 also has the infrared ray receiving unit 290 and receives a control signal by infrared rays sent from the remote control 300 by the infrared ray receiving unit 290 to perform a predetermined operation corresponding to the control signal. The configuration of the television 200 will be described in detail below.

An antenna (not shown) receives an electromagnetic wave sent from an external broadcasting station. The television tuner 210 extracts a video signal of an objective channel from the electromagnetic wave received via the antenna (not shown).

The ADC 211 converts the video signal of the channel received by the television tuner 210 from an analog format to a digital format. The video signal after conversion into a digital signal is outputted to the image processor 220.

The image processor 220 performs various image processes on the video signal obtained from the ADC 211. For example, the image processor 220 performs various image processes such as a gamma correction and flaw correction on the video signal obtained from the television tuner 210. The image processor 220 outputs the video signal on which various image processes is performed, to the display monitor 260. The image processor 220 can be realized by a DSP, microcomputer or the like.

The buffer 230 functions as a work memory of the image processor 220 and the controller 240. The buffer 230 can be realized by, for example, a DRAM or ferroelectric memory.

The operation member 250 receives an operation from the user, and is configured by, for example, a power switch or channel change switch to receive the operation from the user.

The wireless LAN communication unit 270 is a communication unit to realize wireless communication and can connect to the network 400 through wireless communication. The wireless LAN communication unit 270 is modularized in most cases, but may be configured as a portion of the controller 240. The television 200 performs various kinds of communication with the digital camera 100 via the network 400 connected through wireless communication. For example, the television 200 can obtain image data from devices such as the digital camera 100 via the network 400. Moreover, for example, the television 200 can obtain a control program which is stored in the internal memory 114 of the digital camera 100 via the network 400 and controls the television 200. The television 200 can also store the image data and the control program obtained from devices such as the digital camera 100 in the internal memory 280.

The controller 240 controls the entire television. 200. The controller 240 can be realized by a semiconductor device or the like. The controller 240 may be configured only by hardware or a combination of hardware and software. The controller 240 can be realized by a microcomputer or the like. The controller 240 controls the entire television 200 based on the control program stored in the internal memory 280 or the control program obtained from the digital camera 100 via the network 400.

The internal memory 280 is configured by a flash memory, ferroelectric memory or the like. The internal memory 280 stores the control program or the like to control the entire television 200.

The display monitor 260 can display video images indicated by a video signal on which various image processes is performed by the image processor 220 and images indicated by the image data stored in the internal memory 280. The display monitor 260 can be realized by a plasma display, liquid crystal display or the like.

1-2-3. Configuration of Remote Control

Figure 4:
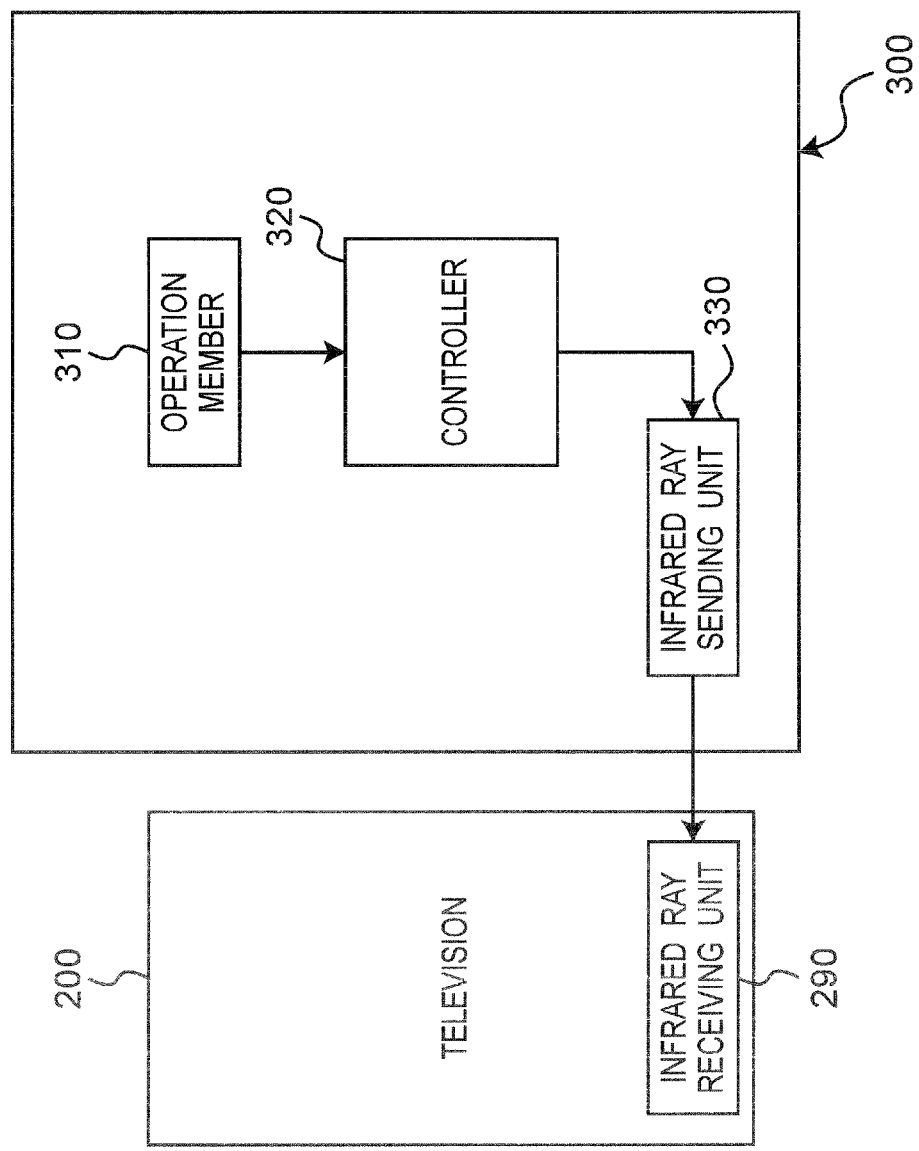
FIG. 4 is a block diagram showing a configuration of the remote control.

FIG. 4 is a block diagram showing the configuration of the remote control 300. If an operation member 310 of the remote control 300 is operated, a controller 320 sends an electric signal corresponding to the operation to an infrared ray sending unit 330. The infrared ray sending unit 330 converts the electric signal into an infrared ray signal and outputs the infrared ray signal. The outputted infrared ray signal is inputted into the infrared ray receiving unit 290 of the television 200. Accordingly, when the operation member 310 of the remote control 300 is operated, predetermined control is performed to the television 200.

1-2-4. Correspondences

The digital camera 100 is an example of an electronic device. The television 200 is an example of an external device. The memory card 111 is an example of a recording unit. The operation member 113 of the digital camera 100 is an example of an operating unit of the electronic device. The wireless LAN communication unit 115 is an example of a sending unit. The wireless LAN communication unit 270 of a television 200 is an example of a receiving unit. The operation member 250 of a television 200 or the remote control 300 is an example of an operating unit of the external device. A PUSH mode is an example of a first communication mode. A PULL mode is an example of a second communication mode. The display monitor 112 is an example of a display unit. The controller 180 is an example of a controller.

1-3. Operations

Operations of the digital camera 100 and the television 200 connected via a network will be described.

1-3-1. Connection Operation to Network

To set the digital camera 100 and the television 200 to the image sharing mode, it is necessary to connect each device to the same network. The image sharing mode is a mode that causes the television 200 to display the image recorded in the digital camera 100. Connection operations to a network will be described with reference to FIGS. 5 to 7.

1-3-1-1. Operation of Connecting Television Receiver to Network

Figure 5:
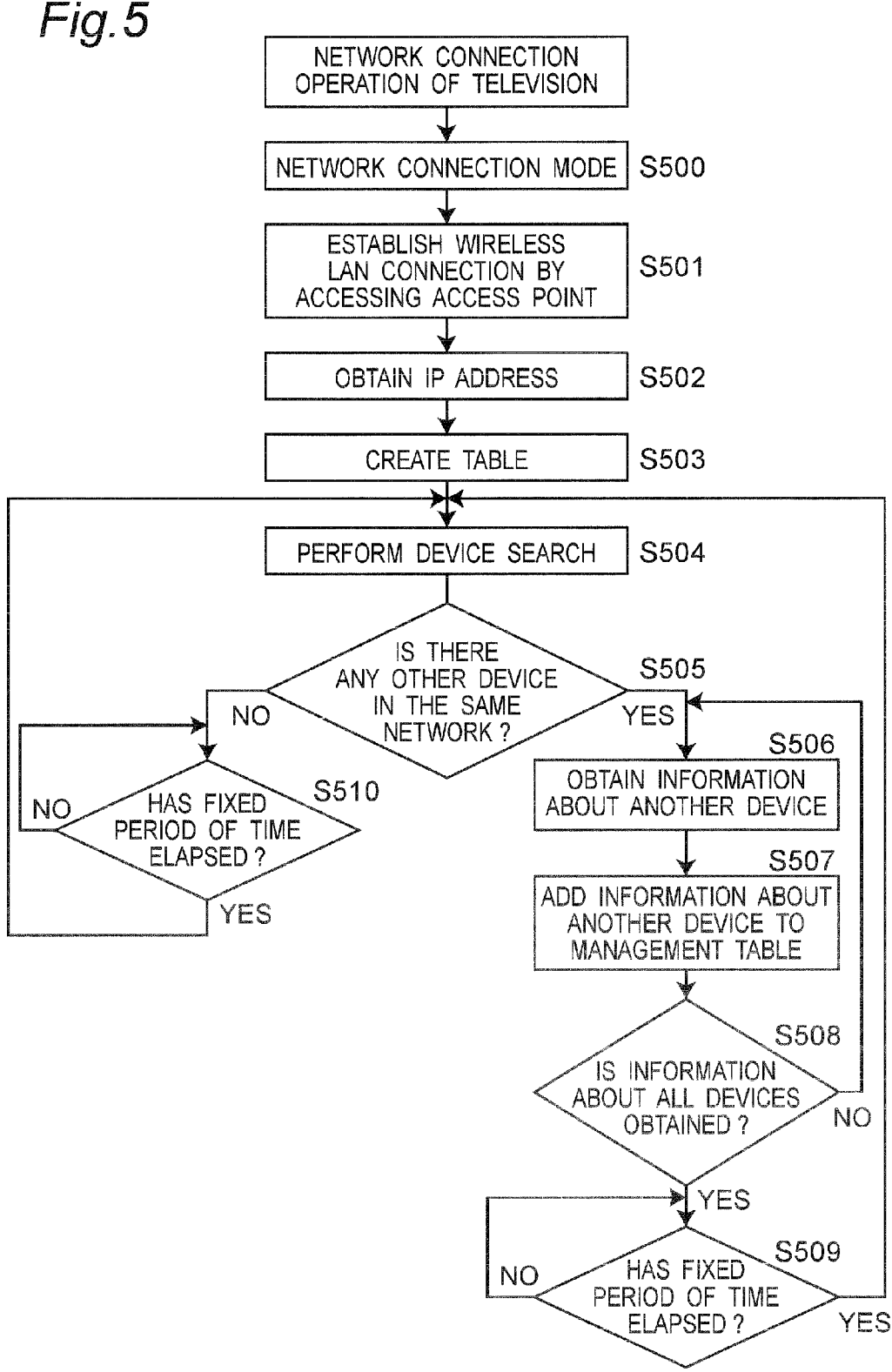
FIG. 5 is a flow chart of a network connection operation of the television.

First, the operation of connecting the television 200 to the network 400 will be described with reference to FIG. 5. FIG. 5 is a flow chart illustrating the operation of connecting the television 200 to the network 400.

When the operation to connect the television 200 to the network 400 is performed by the user on the operation member 250 of the television 200, the television 200 is set to a network connection mode (S500). When the television 200 is set to the network connection mode, the controller 240 accesses an access point in the network 400 via the wireless LAN communication unit 270 to establish a wireless LAN connection (S501). After the wireless LAN connection is established, the controller 240 obtains an IP address from the access point via the wireless LAN communication unit 270 (S502).

After the IP address is obtained, the controller 240 creates a management table A as shown in FIG. 6A (S503). In this case, for example, it is assumed that the controller 240 has obtained an address "192.168.8.2" as the IP address. At this stage, the controller 240 creates the management table A containing only data of the first row ("Device: Television", "Address: 192.168.9.2") shown in FIG. 6A. In the embodiment, the steps from establishing a wireless LAN connection (S501) to creating a management table A (S503) is performed by an operation of the user. Nevertheless, the steps may be performed in regardless with an operation of the user. For example, the steps may be performed when the television 200 turns on.

After the management table A is created, the controller 240 searches for other devices (device search) connected to the same network via the wireless LAN communication unit 270 (S504).

If the controller 240 determines that no other device is connected to the same network 400 (S505), the controller 240 waits until a fixed period of time elapses (S510). When the fixed period of time elapses, the controller 240 restarts the device search (S504).

On the other hand, if another device is connected to the same network 400, the another device announces that the another device is connected to the network, to other device connected to the same network. The controller 240 detects that the other device is connected to the same network (S506), when receiving the announcement. Further, the controller 240 obtains information about other device connected to the same network (S506). More specifically, the controller 240 obtains at least information about the type of the other device connected to the same network and address information of the other device in the network 400 (hereinafter, generically referred to as "information about the other device" for the above information). If the controller 240 detects that a plurality of other devices are connected to the same network, the controller 240 obtains information about other connected device one after another. If the other device connected to the same network sends a program to control the television 200 at this point, the controller 240 obtains the program.

After information about the other device connected to the same network is obtained, the controller 240 adds the obtained information to the already created management table A (S507). For example, FIG. 6A is taken as an example. If the controller 240 determines that the digital camera 100 is connected to the same network, the controller 240 adds information about the digital camera 100 to the management table A. More specifically, the controller 240 adds information, that is, Device: "Digital camera", Address "192.168.8.3" to the management table A.

After information about other devices is added to the management table A, the controller 240 determines whether information about all other devices connected to the same network have been obtained (S508). If the controller 240 determines that information about all other devices is not yet obtained, the controller 240 repeats obtaining information about other devices not yet obtained (S506 to S508).

On the other hand, if the controller 240 determines that information about all other devices has been obtained, the controller 240 determines whether a fixed period of time has elapsed (S509). If the controller 240 determines that the fixed period of time has elapsed, the controller 240 repeats the device search to examine whether any other device not yet detected is connected to the same network 400 (S504).

With the above procedures, the television 200 can obtain information about types and IP addresses of other devices connected to the same network thereof when the television 200 is connected to the network 400. Also when the television 200 is connected to the network, the television 200 can obtain a control program to control the television 200 from the digital camera 100 in the image sharing mode.

1-3-1-2. Operation of Connecting Digital Camera to Network

Figure 7:
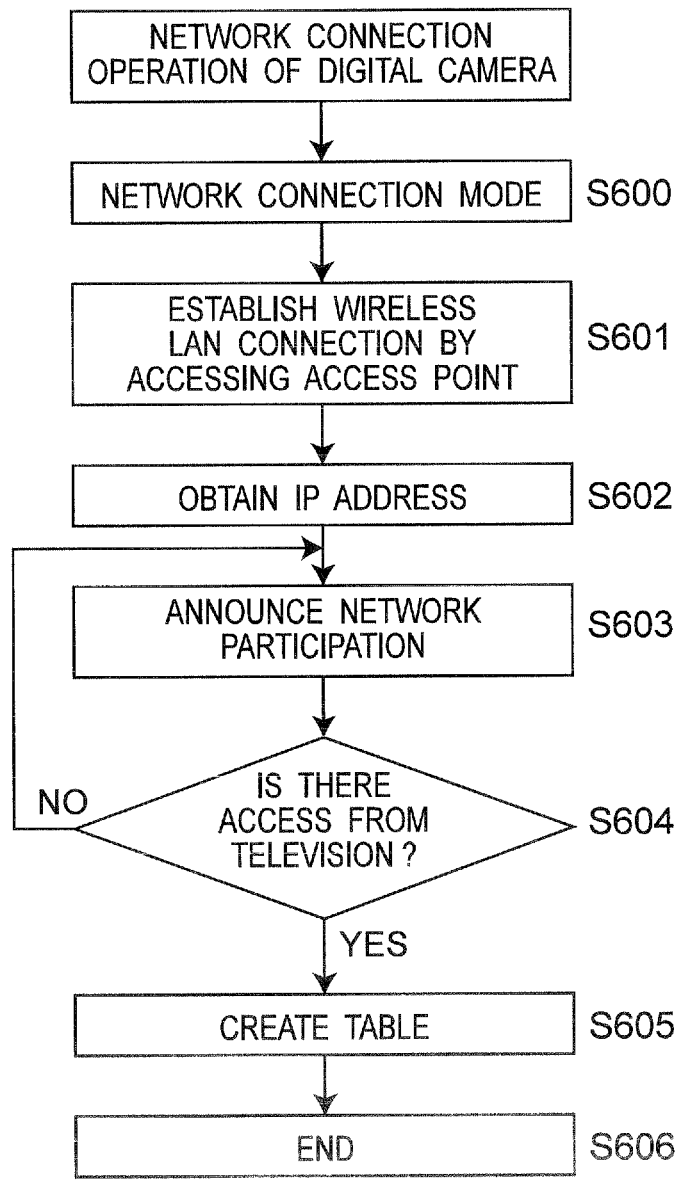
FIG. 7 is a flow chart of a network connection operation of the digital camera.

Next, the operation of connecting the digital camera 100 to the network 400 will be described with reference to FIG. 7. FIG. 7 is a flow chart illustrating the operation of connecting the digital camera 100 to the network 400.

When the operation to connect the digital camera 100 to the network 400 is performed by a user on the operation member 113 of the digital camera 100, the television 200 is set to the network connection mode (S600). When the digital camera 100 is set to the network connection mode, the controller 180 accesses an access point in the network 400 via the wireless LAN communication unit 115 to establish a wireless LAN connection (S601). After the wireless LAN connection is established, the controller 180 obtains the IP address from the access point via the wireless LAN communication unit 115 (S602).

After the IP address is obtained, the controller 180 announces that the digital camera 100 has participated, to other devices connected to the network 400 (S603). After the participation is announced to the other devices, the controller 180 determines whether it has been accessed by the television 200 connected to the same network 400 (S604). If not accessed, the controller 180 repeats the announcement in step S603 until it is accessed by the television 200.

When accessed by the television 200, the controller 180 creates a management table as shown in FIG. 6B (S605). The controller 180 also notifies the television 200 of a program to control the television 200.

In this manner, when the network connection is completed, the digital camera 100 can obtain information about the type and the IP address of the television 200 present in the same network thereof.

1-3-2. Mode Switching Operation by Remote Control

Figure 8A:
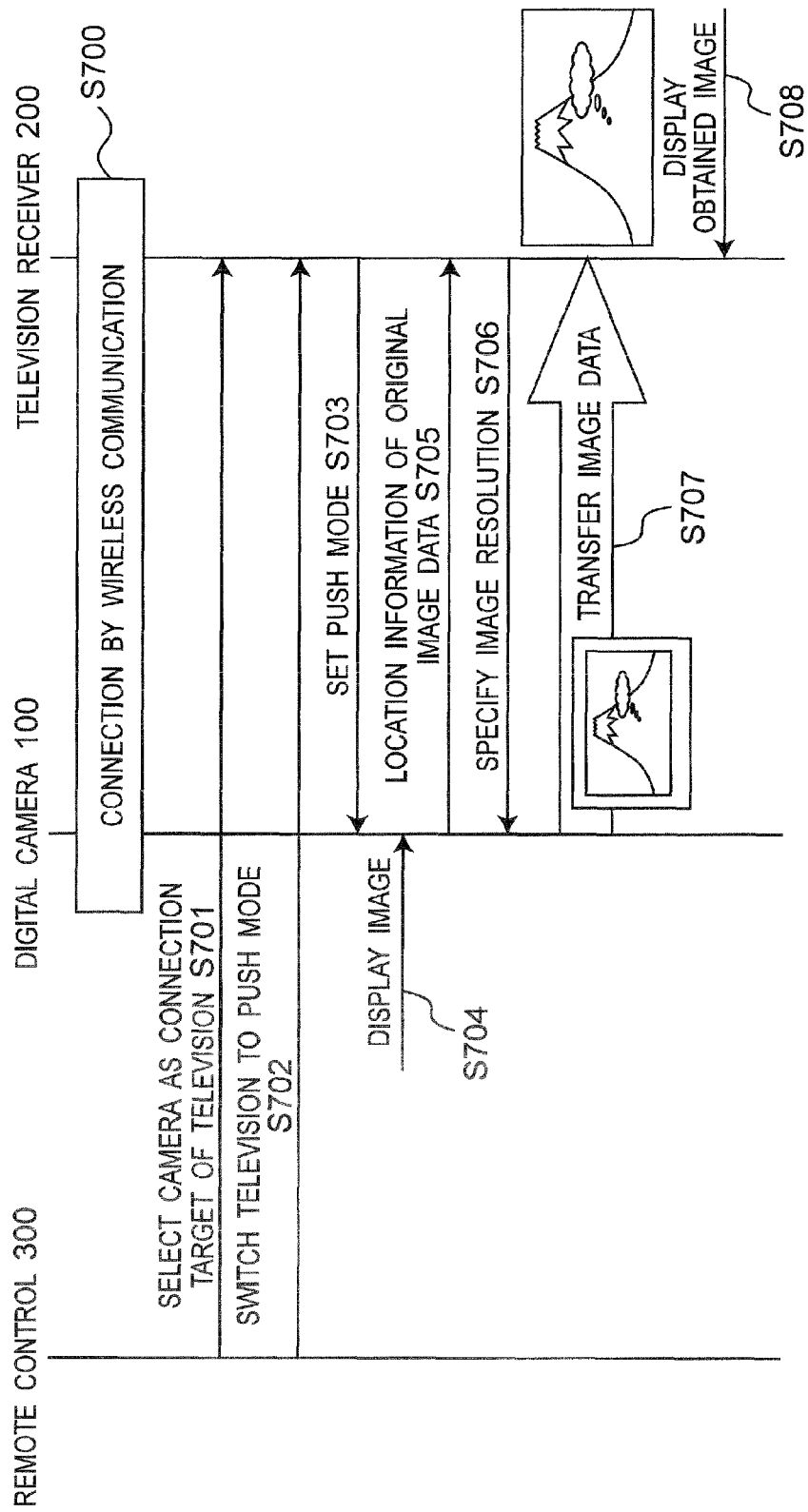
FIG. 8A is a sequence diagram illustrating an operation of the digital camera and the television (when an operation by the remote control is performed in a PUSH mode)
Figure 8B:
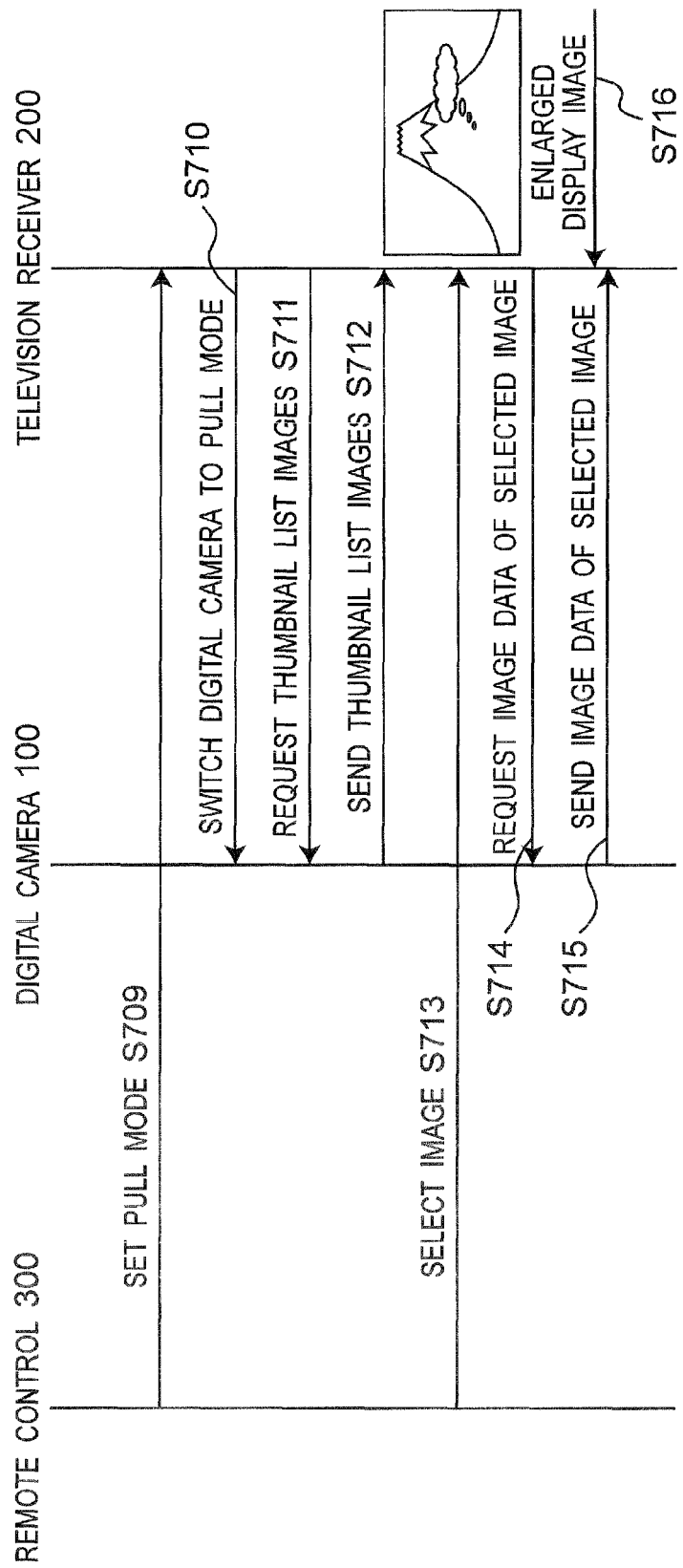
FIG. 8B is a sequence diagram illustrating the operation of the digital camera and the television (when the operation by the remote control is performed in a PULL mode)

FIGS. 8A and 8B are sequence diagrams showing the operation to cause the television 200 to display an image by user's operation on the remote control 300.

As modes to cause the television 200 to display an image, there are two modes of the PUSH mode and the PULL, mode with different initiatives. The "PUSH mode" is a mode enabling the digital camera 100 to send image data stored in the memory card 111 of the digital camera 100 to the television 200 via the network 400 connected through wireless communication and display an image indicated by the image data, by operating the operation member 113 of the digital camera 100. The "PULL mode" is a mode enabling the television 200 to obtain image data stored in the memory card 111 of the digital camera 100 via the network 400 and display an image indicated by the image data, by operating the operation member 310 of the remote control 300. The digital camera 100 and the television 200 have the PUSH mode and the PULL mode, respectively. Specifically, the controller 180 of the digital camera 100 has the PUSH mode which controls the wireless LAN communication unit 115 so that the wireless LAN communication unit 115 sends the image data selected by the operation member 113 to the television 200, and the PULL mode which controls the wireless LAN communication unit 115 so that the wireless LAN communication unit 115 sends the image data requested by the television 200 to the television 200. The controller 240 of the television 200 has the PUSH mode which controls the display monitor 260 so that the display monitor 260 displays image indicated by the image data sent from the digital camera 100, and the PULL mode which acquires the image data selected by the operation member 113 from the digital camera 100 and controls the display monitor 260 so that the display monitor 260 displays image indicated by the image data to the television 200. In the PUSH mode, the power of the television 200 can be switched from OFF to ON, and the television 200 can be switched from the display of video images received by the television tuner 210 to the display of images stored in the digital camera 100 by operating the operation member 113 of the digital camera 100.

1-3-2-1. When Switching Operation from PULL Mode to PUSH Mode is Performed

First, a case where an operation to switch the television 200 to the PUSH mode is performed will be described with reference to FIG. 8A. After the digital camera 100 and the television 200 has been turned on, when a wireless connection (connection to the network 400 through wireless communication) is selected from a menu displayed in the display monitor 112 of the digital camera 100, the controller 180 of the digital camera 100 is connected to the network 400 through wireless communication and further to the television 200 via the network 400 (S700). In general, the television 200 can have, in addition to the digital camera 100, a plurality of connection targets such as a video recorder, video game machine and other digital cameras and the like. Thus, the user specifies the digital camera 100 as the connection target of the television 200 from among the plurality of connection targets by operating the remote control 300 (S701).

If the user performs the operation to switch the television 200 to the "PUSH mode" by operating the remote control 300, the television 200 is switched to the "PUSH mode" and then waits for a subsequent operation (S702). That is, the controller 320 of the remote control 300 receives the operation by the user and sends an instruction to switch to the "PUSH mode" to the controller 240 of the television 200 through infrared ray communication via the infrared ray sending unit 330. After the instruction to switch to the "PUSH mode" is received, the controller 240 of the television 200 sends an instruction to switch the digital camera 100 to the PUSH mode to the controller 180 of the digital camera 100 via the network 400 (S703). With this process, the digital camera 100 is set to the PUSH mode in which the digital camera can send an image to the television 200 to display an image on the television 200. At this point, the television 200 is also set to the "PUSH mode" to be able to receive communication from the digital camera 100.

If the user performs a menu operation of the digital camera 100 when the digital camera 100 is in the PUSH mode, the digital camera 100 performs an image display corresponding to the menu operation (S704). For example, the digital camera 100 can cause the display monitor 112 of the digital camera 100 to display an image recorded in the memory card 111 in accordance with the user's operation. The digital camera 100 also performs reproduction of an image selected by the user as the image to be sent to the television 200 from among the displayed images. The digital camera 100 can cause the display monitor 112 to display, for example, a list of a thumbnail of the image data by the user's operation. The digital camera 100 can send only image data of the images selected from the displayed thumbnail list screen by the user as images desired to be displayed in the television 200. Accordingly, the digital camera 100 can prevent failed images and images that need not be displayed among the images recorded in the memory card 111 from being displayed in the television 200 in accordance with the user's operation.

After the image data to be sent from the digital camera 100 to the television 200 is selected by the user, the controller 180 of the digital camera 100 issues location information of the selected image data to the controller 240 of the television 200 via the network 400 (S705). The location information includes address information of the digital camera 100 in the network and directory information in the memory card 111. If the address information of the digital camera 100 in the network is "192.168.8.3" and a directory where the image data to be sent is stored inside the memory card 111 is "/hdd/001.jpg", the location address becomes "192.168.8.3/hdd/001.jpg".

After the location information of the image data is obtained, the controller 240 of the television 200 stores the obtained location information in the internal memory 280. After the location information is stored in the internal memory 280, the controller 240 of the television 200 sends information about resolution (size) of an image displayable by the television 200 to the controller 180 of the digital camera 100 (S706). If, for example, the television 200 can display a full high-definition image, the controller 240 of the television 200 sends information indicating "1920×1080" pixels to the digital camera 100.

After information about a resolution of an image is obtained, the controller 180 of the digital camera 100 controls the image processor 160 so that the image data indicating the images selected by the user is converted into image data with the resolution indicated by the obtained resolution information. It is assumed for example, that the resolution of the image data indicating the images selected by the user is "4000×2000" pixels. In this case, the controller 180 of the digital camera 100 controls the image processor 160 so that image data of "1920×1080" pixels is generated based on the image data of "4000×2000" pixels. After the image data matching the resolution of the television 200 is generated by the image processor 160, the controller 180 of the digital camera 100 sends the image data generated by the image processor 160 to the controller 240 of the television 200 via the network 400 (S707). Specifically, for example, the controller 240 of the television 200 acquires the image data generated by the image processor 160 from the digital camera 100 via the network 400 based on location information of the selected image data.

The controller 240 of the television 200 displays images indicated by the obtained image data in the display monitor 260 (S708).

In the PUSH mode, the television 200 displays only images received from the digital camera 100. Thus, when an image different from an image displayed in the television 200 is displayed in the display monitor 112 of the digital camera 100 or when determining whether it is necessary to send an image, the images displayed in the display monitor 260 are not reflected in the display monitor 260 of the television 200. When image data is sent from the digital camera 100, the television 200 reflects only images indicated by the image data to the display monitor 260.

1-3-2-2. A Case where Operation to Switch Television to PULL Mode is Performed

Next, a case where an operation to switch the television 200 to the PULL mode is performed will be described with reference to FIG. 8B. To set to the PULL mode, the remote control 300 is operated to set the television 200 to the PUTT, mode (S709). The controller 320 of the remote control 300 sends an instruction to set the television 200 to the PULL mode to the controller 240 of the television 200 through infrared ray communication. After the controller 240 receives the instruction to set to the PULL mode, the controller 240 of the television 200 issues an instruction to switch to the "PULL mode" to the controller 180 of the digital camera 100 via the network 400 (S710). After being set to the PULL mode, the digital camera 100 enters a state in which the next process can be performed. Thus, if the digital camera 100 is set to the PULL mode, the user cannot send images by operating the digital camera 100. Hereafter, the television 200 displays images based on the operation of the remote control 300. Notification of the PULL mode by the operation of the remote control 300 is an interrupt process and can be performed at any time.

If the television 200 is set to the PULL mode, the controller 240 of the television 200 requests thumbnail of the image data recorded in the memory card 111 to the controller 180 of the digital camera 100 (S711). After receiving the request, the controller 180 of the digital camera 100 sends the thumbnail to the controller 240 of the television 200 (S712). The thumbnails correspond to all image data recorded in the memory card 111. The thumbnail about a part of the image data recorded in the memory card 111 may be sent. The display monitor 260 of the television 200 displays a list of the thumbnail received from the digital camera 100. With this list, the user can select desired image data from the image data recorded in the memory card 111, by selecting thumbnail in a large screen of the television 200.

Then, if a desired image is selected from the thumbnail list images based on the operation of the remote control 300 by the user (S713), the television 200 requests the digital camera 100 to send image data of the selected image (S714). If image data is requested to send, the controller 180 of the digital camera 100 sends the image data to the controller 240 of the television 200 (S715). After the controller 240 of the television 200 receives the image data from the digital camera 100, the controller 240 of the television 200 displays the image indicated by the image data, that is, the selected image in the display monitor 260 by enlarging the image (S716).

1-3-3. Mode Switching Operation by Digital Camera

Figure 9A:
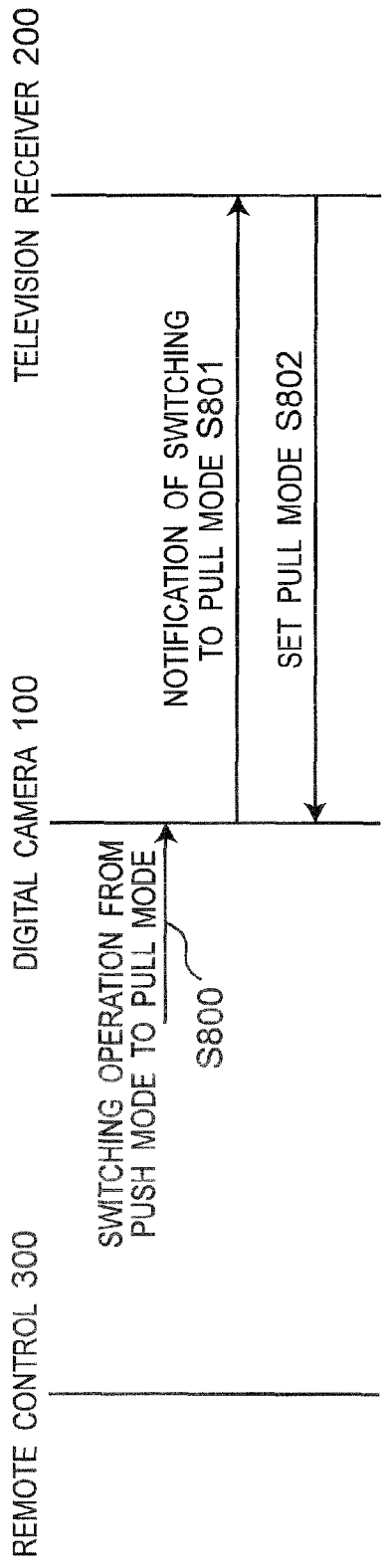
FIG. 9A is a sequence diagram illustrating the operation of the digital camera and the television (when an operation by the digital camera is performed in the PUSH mode)
Figure 9B:
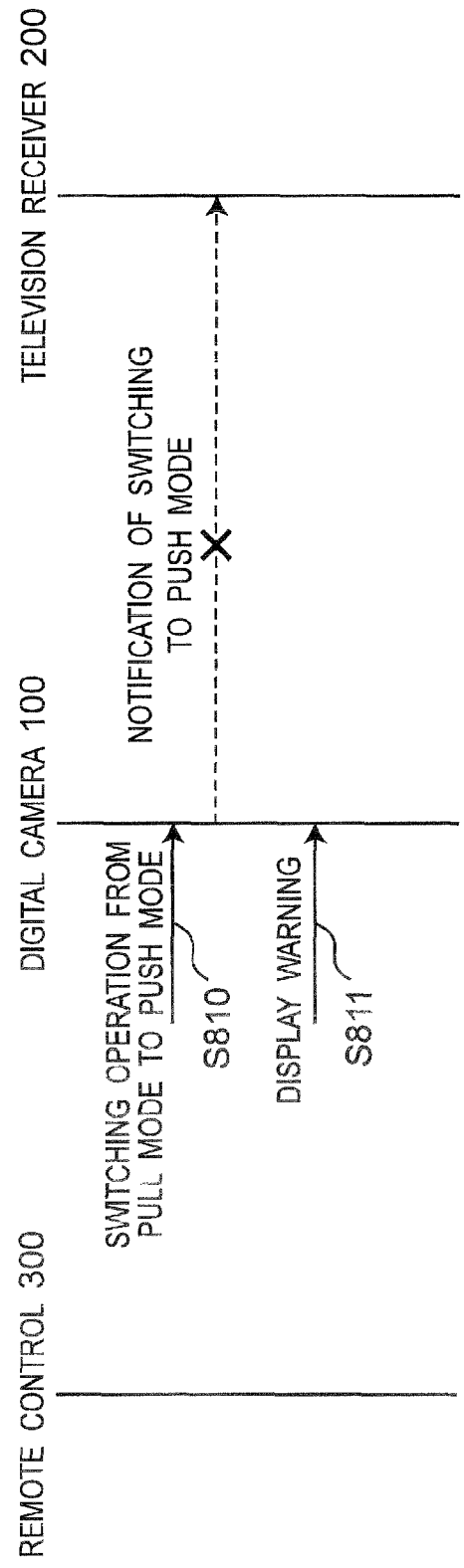
FIG. 9B is a sequence diagram illustrating the operation of the digital camera and the television (when the operation by the digital camera is performed in the PULL, mode)

FIGS. 9A and 9B are sequence diagrams showing the operation when a mode switching operation is performed by user's operation on the digital camera 100 with the digital camera 100 and the television 200 connected via the network 400. The operation will be described below with reference to FIGS. 9A and 9B.

The digital camera 100 in the present embodiment can switch the digital camera 100 and the television 200 from the PUSH mode to the PULL mode by operating the operation member 113 of the digital camera 100. On the other hand, switching the digital camera 100 and the television 200 from the PULL mode to the PUSH mode by operating the operation member 113 of the digital camera 100 is generally prohibited. This point will be described below more concretely.

1-3-3-1. A Case where Switching Operation from PUSH Mode to PULL Mode is Performed First, a case where a switching operation from the PUSH mode to the PULL mode is performed will be described with reference to FIG. 9A. If the user performs the switching operation from the PUSH mode to the PULL mode with the operation member 113 in the digital camera 100 (S801), the controller 180 of the digital camera 100 sends a notification of switching to the "PULL mode" to the controller 240 of the television 200 via the network 400 (S801). After the controller 240 of the television 200 receives the notification of switching to the "PULL mode", the controller 240 switches the television 200 to the PULL mode and also sends an instruction to switch to the PULL mode to the controller 180 of the digital camera 100 via the network 400. When the controller 180 of the digital camera 100 receives the instruction to switch to the "PULL mode" from the television 200, the controller 180 of the digital camera 100 switches the digital camera 100 to the PULL mode (S802). Accordingly, both the digital camera 100 and the television 200 are set to the PULL mode. The operation or the like in the PULL mode is as described above and a description thereof will not be given.

1-3-3-2. When Switching Operation from PULL Mode to PUSH Mode is Performed

Next, a case where a switching operation from the PULL mode to the PUSH mode is performed in the digital camera 100 will be described with reference to FIG. 9B. When the user performs the switching operation from the PULL mode to the PUSH mode with the operation member 113 in the digital camera 100 (S810), the digital camera 100 displays a warning, for example, "The television is being used. Switching from the PULL mode to the PUSH mode is not allowed." in the display monitor 112 (S811), but does not send the notification of switching to the "PUSH mode" to the controller 240 of the television 200. That is, even if the switching operation from the PULL mode to the PUSH mode is performed in the digital camera 100, switching to the PUSH mode is prohibited. Accordingly, the screen of the television 200 can be prevented from being switched in a case where the television 200 is abruptly switched from the PULL mode to the PUSH mode due to, for example, a misoperation on the operation member 113 in the digital camera 100, when the switching operation is a misoperation, the user of the digital camera 100 can recognize that the misoperation or the like was performed.

When the switching operation from the PULL mode to the PUSH mode is performed in the digital camera 100, the control shown in FIG. 9C, may be exercised, instead of the control shown in FIG. 9B. That is, while, in the control shown in FIG. 9B, switching to the PUSH mode is prohibited when the switching operation from the PULL mode to the PUSH mode is performed in the digital camera 100, whereas prohibition of switching can be cancelled when a warning is displayed in the control shown in FIG. 9C. More specifically, when the user performs the switching operation from the PULL mode to the PUSH mode with the operation member 113 (S820), the digital camera 100 displays a warning, for example, "The television is being used. Do you wish to switch from the PULL mode to the PUSH mode?" in the display monitor 112 (S821). Accordingly, if the switching operation is a misoperation, the user of the digital camera 100 can recognize that the misoperation has been performed. Moreover, in a case where, for example, there is a misoperation to the operation member 113 in the digital camera 100, the television 200 can be prevented from being abruptly switched from the PULL mode to the PUSH mode, so that, the screen of the television 200 can be prevented from being abruptly switched. After the warning is displayed, when the user makes a selection to switch from the PULL mode to the PUSH mode with the operation member 113 (S822), the controller 180 of the digital camera 100 notifies the controller 240 of the television 200 of switching to the "PUSH mode" via the network 400 (S823). After the controller 240 of the television 200 receives the notification of switching to the "PUSH mode", the controller 240 of the television 200 sends an instruction to switch the digital camera 100 to the "PUSH mode" to the controller 180 of the digital camera 100 via the network 400 (S824). Accordingly, when the switching operation is not a misoperation, the digital camera 100 can be switched from the PULL mode to the PUSH mode even after a warning is displayed.

With the above procedures, the digital camera 100 is set to the PUSH mode which allows sending the image to the television 200 and causing the television 200 to display the image. At this point, the television 200 is also set to the "PUSH mode" so that communication from the digital camera 100 can be received. Thus, switching from the PULL mode to the PUSH mode is performed by the switching operation of the operation member 113 of the digital camera 100. Therefore, the convenience of the user of the digital camera 100 is secured.

1-4. Summary

As described above, the digital camera 100 according to the first embodiment is connectable to the television 200. The digital camera 100 is capable of outputting the image data recorded in the memory card 111 to the television 200 via the wireless LAN communication unit 115. The digital camera 100 has the operation member 113 that receive an operation by a user to select image data, and the controller 180. The controller 180 has the PUSH mode and the PULL mode. The controller 180 controls the wireless LAN communication unit 115 to send image data selected by the operation member 113 to the television 200 in the PUSH mode, and controls the wireless LAN communication unit 115 to send image data requested from the television 200 to the television 200 in the PULL mode. Accordingly, the digital camera 100 can switch between the mode in which an operator of the digital camera 100 can send desired image data to the television 200 and the mode in which image data requested from the television 200 is sent from the digital camera 100 to the television 200. Therefore, the user can use the method of sending image data from the digital camera 100 and the method of sending image data requested from the television 200 for different purposes.

In the digital camera 100, the PUSH mode and the PULL mode is alternatively selected. That is, when the PUSH mode is selected, the PULL mode is not selected. When the PULL mode is selected, the PUSH mode is not selected. Therefore, the communication process between the digital camera 100 and the television 200 can be made simple.

In the digital camera 100, the PUSH mode and the PULL mode can be selected according to a request from the television 200. The digital camera 100 can thereby switch between the PUSH mode and the PULL mode under the initiative of the television 200 in a position to receive image data. Also, as described in the first embodiment, the PUSH mode and the PULL mode can be switched under the initiative of the remote control 300 by controlling requests from the television 200 to the digital camera 100 with the remote control 300.

In the digital camera 100 according to the present embodiment, the PUSH mode can be switched to the PULL mode by operating the operation member 113 of the digital camera 100. Accordingly, the mode can be switched even if the remote control 300 is not near the user.

In the PULL mode, on the other hand, switching from the PULL mode to the PUSH mode by operating the operation member 113 of the digital camera 100 is generally prohibited. Thus, sending of image data selected by operating the operation member 113 of the digital camera 100 to the television 200 is prohibited. Therefore, in a case where, for example, there is an operation to the operation member 113 in the digital camera 100, the television 200 can be prevented from being abruptly switched from the PULL mode to the PUSH mode. That is, the screen of the television 200 can be prevented from being switched abruptly.

In the digital camera 100, a warning that switching is prohibited may be displayed in the display monitor 112 when the switching operation from the PULL mode to the PUSH mode is performed by the operation member 113 in the PULL mode. Accordingly, the user is prevented from being Suspicious when the mode is not switched even if the operation to switch the mode is performed.

Switching from the PULL mode to the PUSH mode may be enabled by the switching operation to the operation member 113 in the digital camera 100 even after a warning is displayed. Accordingly, the convenience of the user of the digital camera 100 is secured.

The digital camera 100 further includes the display monitor 112 that displays image data and the controller 180 that displays image data recorded in the memory card 111 in the display monitor 112 as a thumbnail list. The operation member 113 selects image data to be sent to the television 200 from the pieces of image data displayed in the display monitor 112 as a thumbnail list according to the user's operation. Accordingly, the digital camera 100 sends only desired image data from the pieces of image data displayed as a thumbnail list. Therefore, the user can select images to be sent while viewing the display of the thumbnail list and send only necessary images from the digital camera 100 to the television 200.

The above-described communication system according to the first embodiment is a communication system configured by the digital camera 100 and the television 200 that can mutually be connected. The digital camera 100 includes the memory card 111 that records image data, the operation member 113 that receives the operation by the user to select image data, the wireless LAN communication unit 115 that sends image data to the television 200, the PUSH mode, and the PULL mode. The television 200 includes the wireless LAN communication unit 270 that receives image data from the digital camera 100 and the operation member 250 that receives the operation by the user to select image data. The wireless LAN communication unit 115 of the digital camera 100 sends the image data selected by the operation member 113 to the television 200 in the PUSH mode and sends the image data selected by the operation member 250 to the television 200 in the PULL mode. Accordingly, a communication system according to the first embodiment can switch between the mode in which an operator of the digital camera 100 can send desired image data to the television 200 and the mode in which image data requested from the television 200 is sent from the digital camera 100 to the television 200. Therefore, the user can use the method of sending image data from the digital camera 100 and the method of sending image data requested from the television 200 for different purposes.

Also in the communication system according to the first embodiment, the operation member 250 is the remote control 300 that can remotely control the television 200. Accordingly, by operating the remote control 300, the user can select images that the television 200 requests from the digital camera 100 from a location away from the television 200.

Moreover, in the communication system according to the first embodiment, when the remote control 300 is operated in the PUSH mode, the digital camera 100 shifts to the PULL mode. Accordingly, the mode can be switched by giving priority to the operations of the remote control 300 over the operations of the digital camera 100. When the remote control 300 is operated, it is assumed that the user more often wants to operate the television 200 than the digital camera 100. The user can immediately operate the television 200 by operating the remote control 300 to cause the television 200 to shift to the PULL mode.

Particularly, in the communication system according to the first embodiment, switching from the PULL mode to the PUSH mode by the operation member 113 of the digital camera 100 when the digital camera 100 is in the PULL mode is prohibited. Thus, sending of image data selected by operating the operation member 113 of the digital camera 100 to the television 200 is prohibited. Therefore, in a case where, for example, there is an operation to the operation member 113 in the digital camera 100, the television 200 can be prevented from being abruptly switched from the PULL mode to the PUSH mode. That is, the screen of the television 200 can be prevented from being switched.

2. Other Embodiments

The technical idea of the embodiment is not limited to the above embodiment and various embodiments can be considered. Other embodiments will be summarized below The digital camera 100 is set to the PULL mode by operating the remote control 300 on the television 200 in the above embodiment, but the technical idea of the embodiment is not limited thereto. For example, the digital camera 100 may be set to the PULL mode by operating the operation member 250 of the television 200 without using the remote control 300.

If the digital camera 100 is in the PUSH mode and the television 200 is ready for receiving a signal from the digital camera 100, the display of the display monitor 260 of the television 200 may immediately be switched to a television program desired to be viewed and desired images may be displayed by operating the remote control 300. In this case, by separately providing the operation member 310 of the remote control 300 as an operation button for setting the PULL mode and an operation button for setting the television program display, the user can display desired images in the display monitor 260 more easily.

When the television 200 is temporarily turned off and then turned on, the set mode may be allowed to continue. That is, when the PUSH mode is set before the television 200 is turned off, the PUSH mode may continue after the power is turned on again and when the PULL mode is set before the television 200 is turned off, the PULL mode may continue after the power is turned on again. Accordingly, for example, when the television 200 is temporarily turned off while displaying images in the television 200 by operating the digital camera 100 and then turned on again, the display in the television 200 can immediately be restarted in the set mode without repeating troublesome connection setting operations to the digital camera 100.

In the digital camera 100 according to the above embodiment, image data is recorded in the memory card 111 connected to the card slot 190, but the technical idea of the embodiment is not limited thereto. For example, an internal memory for storing image data may be provided to store the image data in the internal memory.

The digital camera 100 according to the above embodiment includes the wireless LAN communication unit 115 to communicate with the television 200 (to send image data to the television 200), but a wireless LAN function does not have to be necessarily included. The digital camera 100 may be made communicable with the television 200 by connecting, for example, an SD card having the wireless LAM function to the card slot 190. It should not be noted that the same is applicable if the television 200 includes a card slot to which an SD card or the like can be connected.

In the digital camera 100 according to the above embodiment, switching from the PUSH mode to the PULL mode is generally prohibited, but the prohibition may be made withdrawable by a setup menu or the like.

In the above embodiment, switching from the PULL mode to the PUSH mode is prohibited from the digital camera 100, but switching from the PULL mode to the PUSH mode may be prohibited from the television 200. For example, when a switching instruction to the PULL mode is issued from the digital camera 100 to the television 200 in the PULL mode, the switching may be prohibited from the television 200.

INDUSTRIAL APPLICABILITY

Technical ideas derived from the present embodiment can be widely applied to electronic devices that record image data and can send and receive image data via a network such as mobile terminals, imaging devices of video images, and smart phones.

What is claimed is:

1. An electronic device capable of connecting to an external device and outputting image data recorded in an internal or external recording medium through an internal or external sending unit to the external device, the electronic device comprising:
   an operation unit operable to receive an operation made by a user; and
   a controller operable to control sending the image data, wherein
   the controller has a first communication mode which controls the sending unit so as to send image data selected by the operation unit, and a second communication mode which controls the sending unit so as to send image data requested from the external device,
   the controller prohibits switching from the second communication mode to the first communication mode even when an operation to switch from the second communication mode to the first communication mode is performed on the operation unit in the second communication mode, and
   the controller controls a predetermined device to warn when the operation of switching from the second communication mode to the first communication mode is performed on the operation unit in the second communication mode.

2. The electronic device according to claim 1, further comprising:
an image display unit operable to display an image, wherein
the controller controls the image display unit as the predetermined device to display a warning when the operation of switching from the second communication mode to the first communication mode is performed on the operation unit in the second communication mode.

3. The electronic device according to claim 1, wherein the controller cancels prohibition of switching from the second communication mode to the first communication mode when the operation of switching from the second communication mode to the first communication mode by the operation unit is further performed on the operation unit after the controlling the predetermined device to warn.

4. The electronic device according to claim 1, further comprising:
a display unit operable to display the image data; and
a display controller operable to display a list of thumbnail of image data recorded in the recording medium on the display unit by list, wherein
the operation unit selects the image data to be sent to the external device by selecting a thumbnail in the list of thumbnail displayed in the display unit.

5. A communication system comprising an electronic device and an external device that are mutually connected, wherein
the electronic device is capable of connecting to the external device and outputting image data recorded in an internal or external recording medium through an internal or external sending unit to the external device, and includes:
an operation unit operable to receive an operation by a user; and
a controller operable to control sending the image data, wherein
the controller has a first communication mode which controls the sending unit so as to send image data selected by the operation unit, and a second communication mode which controls the sending unit so as to send image data requested from the external device,
the controller prohibits switching from the second communication mode to the first communication mode even when an operation to switch from the second communication mode to the first communication mode is performed on the operation unit in the second communication mode, and
the controller controls a predetermined device to warn when the operation of switching from the second communication mode to the first communication mode is performed on the operation unit in the second communication mode,
the external device includes
a receiving unit operable to receive the image data from the electronic device, and
the operation unit operable to receive the operation made by the user.

6. The communication system according to claim 5, wherein
the operation unit of the external device is an operation device capable of remotely operating the external device.

7. The communication system according to claim 5, wherein
the electronic device shifts to the second communication mode, when the operation of switching from the second communication mode to the first communication mode on the operation unit of the external device is performed in the first communication mode.

8. An electronic device comprising:
a non-transitory recording medium for storing one or more image data;
a communication unit for transmitting data to and receiving data from an external device;
an operation unit operable to receive operations made by a user;
an output unit for outputting information to the user; and
a controller configured to control the electronic device to operate in:
a PUSH mode in which the communication unit transmits selected ones of the one or more image data to the external device based upon an operation made by the user; and
a PULL mode in which the communication unit receives a request for selected ones of the one more image data from the external device, and the communication unit transmits the selected ones of the one or more image data to the external device in accordance with the request,
wherein the controller is further configured to generate a warning to be output by the output unit when the operation unit receives an operation to switch from the PULL mode to the PUSH mode.

* * * * *